US007560509B2

(12) United States Patent
Hall

(10) Patent No.: US 7,560,509 B2
(45) Date of Patent: Jul. 14, 2009

(54) METHOD OF DIRECTING GRAFTING BY CONTROLLING THE LOCATION OF HIGH VINYL SEGMENTS IN A POLYMER

(75) Inventor: James E. Hall, Mogadore, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 125 days.

(21) Appl. No.: 11/617,850

(22) Filed: Dec. 29, 2006

(65) Prior Publication Data
US 2008/0161484 A1 Jul. 3, 2008

(51) Int. Cl.
C08F 287/00 (2006.01)
C08F 2/38 (2006.01)
C08L 53/00 (2006.01)

(52) U.S. Cl. .......................... 525/88; 525/98; 525/285; 525/308; 525/316; 525/942; 524/505

(58) Field of Classification Search ................... 525/88, 525/98, 285, 308, 316, 942; 524/505
See application file for complete search history.

(56) References Cited

U.S. PATENT DOCUMENTS

| | | | |
|---|---|---|---|
| 4,068,050 A | | 1/1978 | Danzig et al. |
| 4,153,647 A | * | 5/1979 | Glukhovskoi et al. ....... 525/250 |
| 4,429,091 A | | 1/1984 | Hall |
| 4,476,240 A | | 10/1984 | Hall et al. |
| 4,518,753 A | | 5/1985 | Richards et al. |
| 4,581,429 A | | 4/1986 | Solomon et al. |
| 4,591,624 A | | 5/1986 | Hall |
| 4,845,165 A | | 7/1989 | Halasa et al. |
| 4,960,831 A | | 10/1990 | Willis et al. |
| 5,077,346 A | | 12/1991 | Dias et al. |
| 5,322,912 A | | 6/1994 | Georges et al. |
| 5,401,804 A | | 3/1995 | Georges et al. |
| 5,549,998 A | | 8/1996 | Georges et al. |
| 5,627,248 A | | 5/1997 | Koster et al. |
| 5,677,388 A | | 10/1997 | Koster et al. |
| 5,721,320 A | | 2/1998 | Priddy et al. |
| 5,869,588 A | | 2/1999 | Toan et al. |
| 5,919,871 A | | 7/1999 | Nicol et al. |
| 5,959,033 A | | 9/1999 | Demirors et al. |
| 6,103,846 A | | 8/2000 | Willis et al. |
| 6,111,025 A | | 8/2000 | Visger et al. |
| 6,228,908 B1 | | 5/2001 | Takeichi et al. |
| 6,255,402 B1 | | 7/2001 | Boutillier et al. |
| 6,271,308 B1 | | 8/2001 | de Boer et al. |
| 6,333,381 B1 | | 12/2001 | Asada et al. |
| 6,353,065 B1 | | 3/2002 | Charleux et al. |
| 6,362,269 B1 | | 3/2002 | Ishihata et al. |
| 6,369,162 B1 | | 4/2002 | Visger et al. |
| 6,376,615 B1 | | 4/2002 | Guerrero-Santos et al. |
| 6,420,502 B1 | | 7/2002 | Chung |
| 6,444,754 B1 | | 9/2002 | Chin et al. |
| 6,476,133 B1 | | 11/2002 | Jungling et al. |
| 6,521,710 B1 | | 2/2003 | Roth et al. |
| 6,525,140 B1 | | 2/2003 | Dedecker |
| 6,525,151 B1 | | 2/2003 | Roth et al. |
| 6,531,547 B1 | | 3/2003 | Visger et al. |
| 6,624,263 B2 | | 9/2003 | Matyjaszewski et al. |
| 6,673,892 B2 | | 1/2004 | Martinez et al. |
| 6,762,218 B2 | | 7/2004 | Geprags et al. |
| 6,780,917 B2 | | 8/2004 | Hashimoto et al. |
| 7,125,940 B2 | | 10/2006 | Willis |
| 2002/0045685 A1 | | 4/2002 | Ogoe et al. |
| 2003/0050411 A1 | | 3/2003 | Gaynor et al. |
| 2003/0065097 A1 | | 4/2003 | De Groot et al. |
| 2004/0030021 A1 | | 2/2004 | Mitsunaga et al. |
| 2004/0157994 A1 | | 8/2004 | Kubo et al. |

FOREIGN PATENT DOCUMENTS

| | | |
|---|---|---|
| WO | WO 97/36894 A1 | 10/1997 |
| WO | WO 97/49741 A1 | 12/1997 |
| WO | WO 97/49742 A1 | 12/1997 |
| WO | WO 99/46261 A1 | 9/1999 |
| WO | WO 02/48109 A2 | 6/2002 |

OTHER PUBLICATIONS

Braun, Dietrich, "Alkane als initiatoren zur radikalischen polymerization", Angewandte Makromolekulare Chemie, vol. 223, Issue 1, pp. 69-79, Mar. 12, 2003, English Abstract.

Cameron, Neil R. et al., "Butyl Acrylate Polymerization Mediated by a Proxyl Nitroxide", Polymer Preprints 2002, 43 (2), p. 88.

Chin, Hui H., "Compatibilization of poly(phenylene ether) and polyamide-6,6 blends by functionalized polystyrenes", Annual Technical Conference—SPE (2002) 60th, vol. 2, pp. 1329-1333, Abstract only.

Frolov, V.M. et al., "Hydrogenation of Polybutadiene and Butadiene—Vinyltrimethyllsilane Copolymers in the Presence of Metal-Complex Catalysts", Polymer Science, Ser. A, vol. 43, No. 11, pp. 1114-1118, 2001.

Georges, M.K. et al., "Narrow Molecular Weight Resins by a Free-Radical Polymerization Process", Macromolecules, vol. 26, pp. 2987-2988, 1993.

Georges, Michael K. et al., "Stable Free Radical Polymerization Process- Initiation Mechanisms with Benzoyl Peroxide and Various Nitroxides", Polymer Preprints 2002, 43 (2), p. 78.

(Continued)

Primary Examiner—Fred M Teskin
(74) Attorney, Agent, or Firm—Meredith E. Hooker; Nathan T. Lewis

(57) ABSTRACT

A method of producing an engineered plastic selected from the group consisting of high impact polystyrene, styrene-maleic anhydride copolymer, methylmethacrylate-butadiene-styrene copolymer, transparent impact polystyrene, and acrylonitrile butadiene styrene copolymer is provided. The method comprises the steps of: (a) adding a polymer containing at least one high vinyl segment having a 1,2-vinyl bond content of greater than 45% to a solvent comprising at least one vinyl monomer; (b) optionally adding at least one additional inert solvent; (c) optionally adding additives selected from the group consisting of extender oils, modifiers, and antioxidants; and (d) initiating polymerization of the at least one vinyl monomer by the use of an initiator and/or heat, wherein the presence of the at least one high vinyl segment in the polymer allows direction of the grafting site during preparation of the engineered plastic.

25 Claims, No Drawings

OTHER PUBLICATIONS

Gopalan, Padma et al., "Synthesis of Rod-Coil Diblock Copolymers via Nitroxide Functionalized Mesogenic Rod Segments", Polymer Preprints 2002, 43 (2), p. 110.

Han, H. et al., "Boroxyl-Based Living Free Radical Initiators", Polymer Preprints 2002, 43 (2), p. 82.

Hawker, C.J., "Molecular Weight Control by a Living Free-Radical Polymerization Process", J. Am. Chem. Soc., 116, pp. 11185-11186, 1994.

Jayaraman, R.B. et al., "Expoxy and Hydroxy Functional Polyolefin Macromonomers", Journal of Polymer Science: Part A: Polymer Chemistry, vol. 34, pp. 1543-1552, 1996.

Kobatake, Selya et al., "Block Copolymer Synthesis by Styrene Polymerization initiated with Nitroxy-Functionalized Polybutadiene", Macromolecules preprinted from vol. 31, No. 11, pp. 3735-3739. 1998.

Li, Irene et al., "Synthesis, Characterization and Evaluation of Initiators for Living Free Radical Polymerization: Synthesis of Polystyrene with Controled Structure", Polymer Preprints, vol. 36, No. 1, pp. 469-470, 1995.

Moad, Graeme et al., "Reactions of Benzoyloxyl Radicals with Some Common Vinyl Monomers", Makromol. Chem. Rapid Commun., pp. 533-536, 1992.

Nuyken, Oskar et al., "New Concepts for Controlled Radical Polymerization: The DPE-System", Polymer Preprints 2002, 43 (2), p. 84.

Pfaendner, Rudolf et al., "Nitroxyl Based Controlled Free Radical Polymerization- An Additives Manufacturer's Approach", presentation at Commercialization of Controlled Polymer Synthesis, San Francisc Sep. 16-17, 1999.

Priddy, Duane B. et al., "Utility/Limitations of Nitroxide Mediated Polymerization for Low Cost Manufacture of Improved Styrenic Polymers", Polymer Preprints 2002, 43 (2), p. 102.

Quirk, Roderic P. et al., "Anionic Synthesis of Amine-Functionalized Polybutadienes and Their Hydrogenated Analogs", Polymer Preprints 2002, 43(2), pp. 973-974.

Raether, Benedikt et al., "Free-Radical Synthesis of Block Copolymers on an Industrial Scale", Macromolecules Symp., vol. 177, pp. 25-41, 2002.

Rizzardo, E., "Living Free Radical Polymerization", Chemistry in Australia, p. 32, 1987.

Tharanikkarasu, K. et al., "Tetraphenylethane Iniferters: Polyurethane-Polystyrene Multiblock Copolymers Through "Living" Radical Polymerization", Journal of Applied Polymer Science; vol. 66, pp. 1551 1997.

Whitesides, G.M. et al., "Reaction of n-Butyllithium and 2,2,6,6-Tetramethylpiperidine Nitroxyl", J. Org. Chem., vol. 40, No. 23, pp. 3448-3450, 1975.

* cited by examiner

METHOD OF DIRECTING GRAFTING BY CONTROLLING THE LOCATION OF HIGH VINYL SEGMENTS IN A POLYMER

FIELD OF THE DISCLOSURE

The disclosure relates to methods of copolymerization using a polymer comprising a block with a plurality of unsaturated pendent groups, such as vinyl, during the copolymerization.

BACKGROUND OF DISCLOSURE

Copolymerization is one of the most widely used techniques in the polymer industries. For example, polystyrene is one of the largest volume thermoplastic resins in commercial production today. However, homopolymer polystyrene resin is typically a brittle resin having a poor impact strength, and is only suited to applications where its brittleness is acceptable. It has long been known that the impact strength of polystyrene can be greatly improved by the blending/grafting of rubbery particles dispersed throughout the polystyrene matrix. Polystyrene resins of improved strength achieved by incorporation of rubbery particles are often referred to as high impact polystyrene (HIPS).

The physical characteristics and mechanical properties of HIPS are dependent upon many factors, including rubber dispersion and rubber morphology. For example, when HIPS polymers are formed by incorporation of polybutadiene (PB) phase in polystyrene (PS) through the in situ formation of PB-graft-PS, phase separation begins early in the polymerization because of the immiscibility of the rubber within the polystyrene being formed and the depletion of the styrene phase. The immiscibility of PB in PS and the in situ formation of the compatibilizer, PB-graft-PS, gives rise to the formation of varied morphologies of the lamellar, globular, capsule, and other types. These microstructures are responsible for the absorption of energy when the material is subjected to high intensity (impact) or low intensity (tension) forces.

Copolymerization of styrene and butadiene is also necessary in preparing other rubber modified styrenic polymers such as high impact polystyrene, styrene-maleic anhydride copolymer, methylmethacrylate-butadiene-styrene (MBS) copolymer, transparent impact polystyrene, and acrylonitrile butadiene styrene copolymer (ABS). ABS resin generally comprises a rigid matrix copolymer phase of styrene and acrylonitrile monomers having dispersed therein a graft copolymer of a butadiene rubber substrate grafted with the styrene/acrylonitrile copolymer. ABS resins are most often produced by initially preparing a polybutadiene seed latex and copolymerizing styrene and acrylonitrile in emulsion in the presence of the seed latex.

The copolymerization of styrene and polybutadiene to produce HIPS, ABS, and MBS can be conducted via free radical polymerization between the styrene and polybutadiene. Free radical polymerization can be initiated by the use of an initiator. The free radical polymerization is conducted through the unsaturated carbon bonds. Grafting preferentially occurs across the 1,2-vinyl bonds in the polybutadiene. In addition, the location of the 1,2-vinyl bonds in the polybutadiene polymer will determine where grafting takes place. Therefore, it is desirable to be able to control the location of the 1,2-vinyl bonds in the polybutadiene.

Rather than using a free radical polymerization initiator, it is also known to attach radical producing nitroxyl groups to the ends of polymer chains that will produce grafted polymers. However, these nitroxyl groups are subject to thermal decomposition at ~100° C. This makes it difficult to handle the finished polymer in a production environment involving workup and storage.

Advantageously, the present invention provides a novel method of copolymerization that enables the production of engineered plastic copolymer materials such as HIPS with the ability to control the location of the grafting site during polymerization.

SUMMARY OF DISCLOSURE

A method of producing an engineered plastic selected from the group consisting of high impact polystyrene, styrene-maleic anhydride copolymer, methylmethacrylate-butadiene-styrene copolymer, transparent impact polystyrene, and acrylonitrile butadiene styrene copolymer is provided. The method comprises the steps of: (a) adding a polymer containing at least one high vinyl segment having a 1,2-vinyl bond content of greater than 45% to a solvent comprising at least one vinyl monomer; (b) optionally adding at least one additional inert solvent; (c) optionally adding additives selected from the group consisting of extender oils, modifiers, and antioxidants; and (d) initiating polymerization of the at least one vinyl monomer by the use of an initiator and/or heat, wherein the presence of the at least one high vinyl segment in the polymer allows direction of the grafting site during preparation of the engineered plastic. The vinyl content refers to alkenyl groups configured pendant to the polymer backbone, as opposed to cis and trans configurations which contain the alkenyl groups within the polymer backbone. The terms vinyl content and vinyl bond content are used interchangeably herein.

Also provided is a method of producing an engineered plastic selected from the group consisting of high impact polystyrene, styrene-maleic anhydride copolymer, methylmethacrylate-butadiene-styrene copolymer, transparent impact polystyrene, and acrylonitrile butadiene styrene copolymer. The method comprises the steps of: (a) forming a living prepolymer high vinyl initiator with a vinyl content greater than about 45% using a vinyl modifier, (b) adding a $R_1R_2R_3$aluminum or $R_1R_2R_3$boron compound to nullify the effect of the vinyl modifier, (c) initiating polymerization of diene monomers using said living prepolymer high vinyl initiator so as to form a polymer product with at least one high vinyl end segment, where $R_1$, $R_2$, and $R_3$ are selected from the group consisting of C1-C12 alkyl, C2-C12 alkene, C2-C12 alkyne, phenyl, and alkyl-substituted phenyl, and may all be identical or may all be separately selected but cannot be H, (d) adding the polymer containing at least one high vinyl end segment to a solvent comprising at least one vinyl monomer; (e) optionally adding at least one additional inert solvent, (f) optionally adding additives selected from the group consisting of extender oils, modifiers, and antioxidants, and (g) initiating polymerization of the at least one vinyl monomer by the use of an initiator and/or heat, wherein the at least one high vinyl end segment of the polymer has a 1,2-vinyl bond content of greater than about 45%.

Also provided is a method for producing an engineered plastic. The method comprises the steps of (a) adding a polymer containing at least one high vinyl segment having a 1,2-vinyl bond content of greater than 45% to a solvent comprising styrene; (b) optionally adding at least one additional inert solvent; (c) optionally adding additives selected from the group consisting of extender oils, modifiers, and antioxidants; and (d) initiating polymerization of the styrene by the use of an initiator and/or heat, wherein the presence of the at least one high vinyl segment in the polymer allows direction of the grafting site during preparation of the high impact polystyrene.

DETAILED DESCRIPTION

A first polymer containing at least one high vinyl segment is initially added to a solvent comprising at least one vinyl monomer. As used herein, "Block A" will represent the high vinyl segment portion of the polymer. The vinyl content of Block A is typically between about 45% and 100%. Thus, the first polymer can also be described as containing at least one Block A segment.

Block A may be formed by anionically polymerizing conjugated diene monomers. Exemplary conjugated diene monomers include one or more of 1,3-butadiene, isoprene, 2-ethyl-1,3-butadiene, 2,3-dimethyl-1,3-butadiene, 1,3-pentadiene, 2-methyl-1,3-pentadiene, 3-methyl-1,3-pentadiene, 4-methyl-1,3-pentadiene, 2,4-dimethyl-1,3-pentadiene, 1,3-hexadiene, and mixtures thereof.

The polymer containing Block A may also optionally comprise a "Block B" segment. Block B may be prepared by anionically polymerizing conjugated diene monomers, examples of which are those suitable for Block A. Block B will also have a certain vinyl content which is typically lower than that of Block A. Thus Block B may have a vinyl content of less than about 45%, or less than about 30%.

The polymer containing Block A may also optionally comprise a "Block C" segment. Block C may be prepared by anionically polymerizing one or more vinyl aromatic monomers. Suitable vinyl aromatic monomers include 1,2-diphenyl-4-methyl-1-hexene, styrene, α-methylstyrene, p-methylstyrene, vinyl toluene, vinyl anthracene, vinyl pyridines such as 2-vinylpyriene and 4-vinylpyridine, vinyl naphthalene such as 1-vinylnaphthalene, 2-vinylnaphthalene, 1-α-methylvinylnaphthalene, 2-α-methylvinylnaphthalene, and the like, and mixtures thereof.

The polymer comprising Block A, and optionally Block B and/or Block C, may be produced by a number of methods. For example, an exemplary first suitable method includes adding suitable Block C and/or Block B monomers to a suitable solvent, initiating polymerization by an anionic initiator, and allowing the reaction to proceed to near completion. As the polymerization reaction of each monomer approaches completion, suitable Block A monomers and a vinyl modifier are added to produce Block A.

The specific order of the blocks in the first polymer is determined by the order in which the monomer units are added. For example, adding monomers for Block B before monomers for Block C, and then subsequently adding monomers for Block A will result in a B—C-A block polymer. Accordingly, adding monomers for Block C before monomer adding monomers for Block B will produce a C—B-A polymer.

Suitable solvents for use in preparing the first polymer according to the first suitable method include hydrocarbon solvents such as pentane, hexane, heptane, octane, nonane, decane, cyclopentane, cyclohexane, cycloheptane, cyclooctane, and mixtures thereof.

Suitable anionic initiators for use in preparing the first polymer according to the first suitable method include organometallic compounds of the alkali metals. Other suitable anionic initiators include activated organometallic compounds of the Group II metals. For example, dialkyl magnesium activated with a group I metal alkoxide.

Exemplary anionic initiators include organolithium compounds, which are known in the art as being useful in the polymerization of the anionically polymerizable monomers. Suitable organolithium compounds include mono-lithium compounds represented by the formula as shown below.

$$R_0Li$$

wherein $R_0$ is a hydrocarbyl group containing 1 to 20, preferably 2-8, carbon atoms per $R_0$ group. Typical $R_0$ groups include aliphatic radicals and cycloaliphatic radicals, such as alkyl, cycloalkyl, cycloalkylalkyl, alkylcycloalkyl, alkenyl, aryl and alkylaryl radicals. Specific examples of $R_0$ groups include, but are not limited to, alkyls such as methyl, ethyl, n-propyl, isopropyl, n-butyl, isobutyl, t-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentylethyl, 4-cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

Suitable organolithium compounds also include multiple-lithium compounds. The multiple-lithium compounds include, but are not limited to, 1,4-dilithiobutane, 1,5-dilithiopentane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like, and the mixture thereof.

Specific suitable lithium initiators include n-butyllithium, seC—Butyllithium, tert-butyllithium, 1,4-dilithiobutane, 1,3-(di-2-(2-lithio-4-methyl)pentenyl)benzene, and any mixture thereof.

The anionic initiator is employed in an amount designed to result in the desired molecular weight of the polymer. The ratio of millimoles of the anionic initiator per hundred grams of the anionically polymerizable monomer ranges between 0.1 millimoles to 100 millimoles, or between 0.2 millimoles to 20 millimoles, or between 0.5 millimoles to 4 millimoles.

A vinyl modifier is added to increase the 1,2-addition reaction (vinyl bond content) of the diene monomer in the preparation of Block A. Such modifying agents are known in the art. These modifying agents may be employed in amounts generally ranging from about 1:100 to about 100:1 molar ratio of the modifier to anionic initiator. The vinyl bond content can be increased from about the 5-15% range to as high as about 90-100% of the diene monomer units being incorporated into Block A.

Exemplary vinyl modifiers include one or more of hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, dipiperidino ethane, tri-n-propyl amine, trimethyl amine, triethyl amine, N,N-dimethyl aniline, N-ethylpiperidine, N-methyl-N-ethyl aniline, and N-methylmorpholine.

With the above-described first suitable exemplary method of forming the first polymer, the living end will preferably be on the Block A group. This is because the Block A monomers are added after the polymerization of the optional Block B and/or Block C monomers, thus leaving the anionic living end on the Block A. Accordingly, a coupling agent may be added to couple two polymer chains together via the Block A groups to produce a first polymer having structures such as B-A-B, C-A-C, C—B-A-B—C, and the like.

Suitable coupling agents are well known in the art. Exemplary coupling agents include $SnCl_4$, alkyl $SiCl_3$, $CO_2$, $CCl_4$, $SiCl_4$, $(PNCl_2)_3$, divinylbenzene, butyl benzoate, $CCl_3COOEt$, and mixtures thereof.

An exemplary second method for preparing the first polymer comprising Block A, and optionally Block B and/or Block C, comprises the steps of (a) forming a living prepolymer high vinyl initiator with a vinyl content greater than about 45% using a vinyl modifier, (b) adding a $R_1R_2R_3$aluminum or $R_1R_2R_3$boron compound to nullify the effect of the vinyl modifier, and (c) initiating polymerization of diene monomers using said living prepolymer high vinyl initiator so as to form a polymer product with at least one high vinyl end segment, where $R_1$, $R_2$, and $R_3$ are selected from the group consisting of C1-C12 alkyl, C2-C12 alkene, C2-C12 alkyne, phenyl, and alkyl-substituted phenyl, and may all be identical or may all be separately selected but cannot be H. Block A is thus formed from the high vinyl initiator segment, and Block B and/or Block C is/are formed from the polymerization of additional diene monomers and vinyl substituted monomers, respectively. The use of the $R_1R_2R_3$aluminum or $R_1R_2R_3$boron compound to nullify the effect of the vinyl modifier allows for the preparation of polymers with the Block A segment on at least one end. Thus, a polymer of the form B-A could be formed. Optional coupling can produce polymers of various forms such as B-A-B if a difunctional coupling agent were used to couple a polymer of the form B-A.

In the exemplary second method for producing the first polymer, the specific order of the blocks in the first polymer is determined by the order in which the monomer units are added. Adding monomers for Block B before monomers for Block C will result in an A-B—C block polymer. Alternatively, adding monomers for Block C before monomers for Block B will result in an A-C—B block polymer.

Suitable monomers for formation of Block A, Block B, and Block C have been discussed above.

Preparation of the living prepolymer high vinyl initiator is carried out by adding an anionic initiator to a mixture of monomers in the presence of solvent and a vinyl modifier. Any anionic initiator known in the art as suitable for the polymerization of conjugated dienes may be used. Examples of suitable anionic initiators, solvents, and vinyl modifiers and are listed above, along with exemplary amounts.

The number average molecular weight ($M_n$) of the living prepolymer high vinyl initiator is in the range of about 100 to 20,000, preferably in the range of about 250 to 5000, and most preferably in the range of about 500 to 2500.

After forming the living prepolymer high vinyl initiator, a $R_1R_2R_3$aluminum or $R_1R_2R_3$boron compound is added to the living prepolymer high vinyl initiator. In the above formulas, $R_1$, $R_2$, and $R_3$ are selected from the group consisting of C1-C12 alkyl, C2-C12 alkene, C2-C12 alkyne, phenyl, and alkyl-substituted phenyl, and may all be identical or may all be separately selected but cannot be H. Exemplary $R_1R_2R_3$aluminum or $R_1R_2R_3$boron compounds include trialkyl compounds. Suitable trialkyl compounds include triethylaluminum, trimethylaluminum, and triisobutylaluminum.

The purpose of adding the $R_1R_2R_3$aluminum or $R_1R_2R_3$boron compound is to nullify the effect of the vinyl modifier. One advantage of nullifying the effect of the vinyl modifier is that additional monomers used to form Block B may be subsequently polymerized into a low vinyl content configuration by simply combining the mixture of living prepolymer high vinyl initiator and $R_1R_2R_3$aluminum or $R_1R_2R_3$boron compound with additional monomer and a suitable solvent. The living prepolymer high vinyl initiator initiates the polymerization of the Block B and/or Block C monomers by continuing living anionic polymerization. Thus, a living polymer with one high vinyl end segment is produced.

The polymerization temperature for the exemplary second method can vary over a broad range from about −50° C. to about 200° C., or from about −20° C. to about 140° C. One advantage of using the $R_1R_2R_3$aluminum or $R_1R_2R_3$boron compound to nullify the effect of the vinyl modifier is that the polymerization temperature does not have to be significantly higher than the temperature at which the living prepolymer high vinyl initiator is formed to create a lower vinyl content. Accordingly, the polymerization temperature may optionally be no more than 20° C. higher than the temperature(s) at which the living prepolymer high vinyl initiator is formed or the $R_1R_2R_3$aluminum or $R_1R_2R_3$boron compound is added. The pressure used preferably is sufficient to maintain the fluidity of the substantially liquid phase under the conditions of the polymerization reaction.

The polymerization reaction is generally conducted for a time sufficient to obtain at least about 80% and preferably about 99% conversion of charged monomer units. The $M_n$ of the uncoupled polymer is in the range of about 20,000 to 500,000, more preferably in the range of about 30,000 to 400,000, and most preferably in the range of about 40,000 to about 300,000.

The living prepolymer high vinyl end segment accounts for a minor portion of the total weight of the polymer composition. For example, the living prepolymer high vinyl end segment may account for less than about 15% of the total weight of the polymer composition, or less than about 10% of the total weight, or less than about 5%. Therefore, the vinyl content of the living prepolymer high vinyl end segment has very little effect on the total vinyl content of the polymer composition. The preferred vinyl content of the total polymer composition is less than about 35%, and preferably less than about 30%.

The living polymer with one high vinyl end segment produced from a living prepolymer high vinyl initiator may be produced by a batch or a continuous process. To make the living polymer in a continuous mode, the living prepolymer high vinyl initiator is made continuously in one reactor and fed to a second reactor where the living polymer with one high vinyl end segment is produced.

The living polymer with one high vinyl end segment produced from a living prepolymer high vinyl end segment above may then be coupled to other living polymers having one high vinyl end segment. Coupling results in a polymer having a high vinyl end segment on all ends of the polymer chain. This would lead to a polymer having two A Blocks. Accordingly, a first polymer with a macrostructure of A-B-A, A-C-A, A-B—C—B-A, and A-C—B—C-A, and the like, may be produced.

A wide variety of coupling agents can be used to couple the living polymers. A di-coupling agent will result in a linear polymer with both end segments having high vinyl content. A tri-coupling agent will result in a star-shaped polymer with all three end segments having high vinyl content, and a tetra-coupling agent will result in a star-shaped polymer with all four end segments having high vinyl content.

Suitable coupling agents include $SnCl_4$, alkyl $SiCl_3$, $CO_2$, $CCl_4$, $SiCl_4$, $PNCl_2$, divinylbenzene, butyl benzoate, $CCl_3COOEt$, and mixtures thereof.

The appropriate amount of coupling agent is calculated based on the amount needed to react with the number of initiator atoms present in the polymer. For example, with a tetrafunctional coupling agent, such as $SnCl_4$, one-fourth of the molecular weight of $SnCl_4$ is calculated as required for each atom of initiator present. As a by-product, the initiator, e.g., $Li^+$, is removed by reaction with chlorine and precipitated from the reaction solution as LiCl.

Using the above-described methods and others either currently known to those of skill in the art or learned in the future), block A may be placed anywhere in the first polymer. For example, the Block A may constitute one or more of the end-blocks of the first polymer. Additionally, Block A may also be placed in the middle of the first polymer chain. Thus, a first polymer may be produced with the following structures: A-B, A-B-A, A-B—C, A-B—C—B-A, B—C-A, A-C, A-C-A, A-C—B—C-A, B-A-B, C-A-C, C—B-A-B—C, and the like.

The first polymer may optionally include a protected free radical "living" end ("F"), which turns the first polymer into a radically active polymer or a free radical generating polymer. Accordingly, a first polymer may have the following structures: F-A-B, A-B—F; F-A-B-A, F-A-B-A-F; F-A-B—C, A-B—C—F; F-A-B—C—B-A-F; F—B—C-A, B—C-A-F; F-A-C, A-C—F; F-A-C-A, F-A-C-A-F; F-A-C—B—C-A, F-A-C—B—C-A-F; F—B-A-B, F—B-A-B—F; F—C-A-C, F—C-A-C—F; F—C—B-A-B—C, F—C—B-A-B—C—F; and the like.

To convert the living end of the first polymer into a protected free radical "living" end, the anionic living end of the first polymer may be capped by reacting the living end with capping agent to produce an end-capped anionic living end, followed by terminating the end-capped anionic living end, or, coupling two of the end-capped anionic living ends, with a carbonyl-containing compound.

In a variety of exemplary embodiments, the capping agent may comprise a steric hindering compound as shown below:

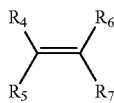

in which $R_4$ and $R_5$ can be each independently H, methyl, or ethyl; and at least one of $R_6$ and $R_7$ is a hindering group such as cyclic and polycyclic aryl group containing from 6 to 18 carbon atoms. In preferred embodiments, $R_6$ is a hindering group, and $R_7$ is also a hindering group which is same as or different from $R_6$.

A specific example of a suitable capping agent is 1,1-diphenylethylene (DPE).

The appropriate amount of capping agent is calculated based on the amount needed to react with the number of initiator atoms present in the polymer.

Termination of the end-capped anionic living end or coupling two of the end-capped anionic living ends may be accomplished in the presence of a carbonyl-containing compound. Preferably, the carbonyl-containing compound has a general formula as shown below:

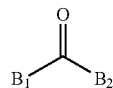

wherein at least one of $B_1$ and $B_2$ is a bulky group, preferably, both $B_1$ and $B_2$ are bulky groups. A bulky croup is typically any chemical group that contains four or more carbon atoms, such as a phenyl or a isobutyl group.

Suitable carbonyl-containing compounds include ketone and ester compounds. For example, the carbonyl-containing compound may have the following formula (I):

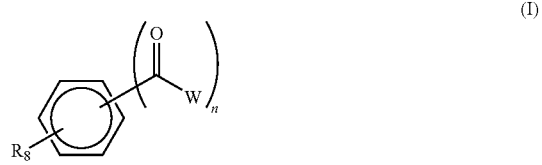

in which $R_8$ is optional but when present is H or C1-C12 alkyl; W is a substituted or unsubstituted aryl group; or W is —$OR_9$ wherein $R_9$ is a straight or branched, substituted or unsubstituted, cyclic or acyclic alkyl group; and n is an integer of 1-6, unless $R_8$ is present and then n is an integer of 1-5.

In preferred exemplary embodiments, when W is a substituted or unsubstituted aryl group such as phenyl, n is 1; when W is —$OR_9$ wherein $R_9$ is a straight or branched, substituted or unsubstituted, cyclic or acyclic alkyl group, n is 2, 3, or 4.

In preferred exemplary embodiments, $R_9$ is a straight or branched alkyl group containing from about 4 to about 20 carbon atoms, preferably from about 5 to about 15 carbon atoms, and more preferably from about 6 to about 12 carbon atoms.

In preferred exemplary embodiments, the formula (I) compound may comprise one or more of benzoate esters.

The capping agent may be added at the polymerization temperature, which may be the temperature in the reaction vessel at the end of the polymerization. The terminator may also be added at the polymerization temperature, although, because terminators are generally very reactive, they can effectively be added at a lower temperature than that used for the polymerization.

After forming the first polymer containing the at least one Block A, the first polymer is added to a solvent comprising at least one vinyl monomer. Suitable solvents include hydrocarbon solvents such as pentane, hexane, heptane, octane, nonane, decane, cyclopentane, cyclohexane, cycloheptane, cyclooctane, and mixtures thereof.

Suitable vinyl monomers are those that are polymerizable by free radical polymerization, such as, for example, mono-substituted or unsymmetrically (1,1-) disubstituted ethylenes. Exemplary vinyl monomers include, but are not necessarily limited to, styrene, α-methyl styrene, ethyl styrene, propyl styrene, p-vinyl toluene, p-amino styrene, diethylaminostyrene (all isomers), vinyl biphenyl, vinyl naphthalene, vinyl anthracene, acrylonitrile, methacrylonitrile, itaconic acid, itaconic anhydride, methacrylic acid, methyl methacrylate, ethyl methacrylate, propyl methacrylate, (all isomers), butyl methacrylate (all isomers), 2-ethylhexyl methacrylate, isobornyl methacrylate, benzyl methacrylate, phenyl methacrylate, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropylmethoxysilylpropyl methacrylate, dimethoxysilylpropyl methacrylate, diethoxysilylpropyl methacrylate, dibutoxysilylpropyl methacrylate, diisopropoxylsilylpropyl methacrylate, acrylic acid, methyl acrylate, ethyl acrylate, propyl acrylate (all isomers), butyl acrylate (all isomers), 2-ethylhexyl acrylate, isobornyl acrylate, benzyl acrylate, phenyl acrylate, glycidyl acrylate, 2-hydroxyethyl acrylate, hydroxypropyl acrylate (all isomers), hydroxybutyl acrylate (all isomers), N,N-diethylaminoethyl acrylate, triethyleneglycol acrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropylmethoxysilylpropyl acrylate, dimethoxysilylpropyl acrylate, diethoxysilylpropyl acrylate, dibutoxysilylpropyl acrylate, diisopropoxylsilylpropyl acrylate, acrylamide, N-methyl acrylamide, N,N-dimethyl acrylamide, N-n-butylacrylamide, N-tert-butylacrylamide, N-methylolacrylamide, N-ethylolacrylamide, methacrylamide, dimethylaminopropyl methacrylamide, N-tert-butylmethacrylamide, N-n-butylmethacrylamide, N-methylolmethacrylamide, N-ethylolmethacrylamide, vinyl benzoic acid (all isomers), α-methylvinyl benzoic acid (all isomers), diethylamino α-methylstyrene (all isomers), p-vinylbenzene sulfonic acid, p-vinylbenzene sulfonic acid sodium salt, vinyl acetate, vinyl butyrate, vinylbenzoate, vinyl chloride, vinyl fluoride, vinyl bromide, vinyltrimethylsilane, tetrafluoroethylene, chlorotrifluoroethylene, maleic anhydride, N-phenylmaleimide, N-vinylpyrrolidone, N-vinylcarbazole, crotonic acid, methyl crotonate, cyclopentene, cyclohexene, cycloheptene, cyclooctene, norbornene, cyclic vinyl ethers, 2,3-dihydrofuran, 3,4-dihydropyran, allylic alcohol, vinylethylene carbonate, diethylfumarate, vinyl alkyl ethers such as ethyl vinyl ether, isoprene, chloroprene, ethylene, propylene, butadiene, and the like, and the mixture thereof.

The ratio between the total weight of the first polymer and the total weight of the at least one vinyl monomer may generally range from about 1:100 to about 20:100, or from about 2:100 to about 15:100, or from about 5:100 to about 10:100. For example, in a HIPS processing, the polymerization of styrene may be performed in the presence of about 5-20% dissolved polybutadiene or butadiene copolymer.

Optionally, at least one additional inert solvent may be added to the mixture of the first polymer and at least one vinyl monomer. Suitable inert solvents include one or more of pentane, hexane, heptane, octane, nonane, decane, cyclopentane, cyclohexane, cycloheptane, cyclooctane.

Optionally, additives selected from the group consisting of extender oils, modifiers, and antioxidants may be added to the mixture of the first polymer and at least one vinyl monomer. Any extender oil, modifier, and antioxidant may be used. Such materials are well known to those skilled in the art. Specific examples of useful antioxidants and stabilizers include 2-(2'-hydroxy-5'-methylphenyl)benzotriazole, nickel di-butyl-di-thiocarbamate, tris(nonylphenyl)phosphite, 2,6-di-t-butyl-4-methylphenol, and the like. Exemplary conventional fillers and pigments include silica, carbon black, titanium dioxide, iron oxide, and the like. These compounding ingredients are incorporated in suitable amounts depending upon the contemplated use of the product, preferably in the range of 1-350 parts by weight of additives or compounding ingredients per 100 parts by weight of the polymer composition.

A reinforcing agent may be defined as material added to a resinous matrix to improve the strength of the polymer. Most reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion, and processability.

The first polymer is then polymerized with the at least one vinyl monomer. Polymerization is accomplished by initiating the reaction by the use of an initiator and/or heat. Suitable initiators include free radical initiators. Any free radical initiator known in the art may be used. Exemplary free radical initiators include dilauroyl peroxide lauroyl acid, dioctanoyl peroxide caprylic acid, didecanoyl peroxide n-decanoic acid, di-n-propionyl peroxide propionic acid, bis(3,5,5-trimethyl hexanoyl)3,5,5-trimethyl peroxide hexanoic acid, dibenzoyl peroxide benzoic acid, bis(2,4-dichlorobenzoyl)2,4dichlorobenzoic acid peroxide, bis(o-methylbenzoyl)peroxide o-methyl benzoic acid, acetyl cyclohexane sulphonyl cyclohexane sulphonic peroxide acid, t-butylperoxypivalate pivalic acid, t-butyl peroxy-2-ethylhexanoate 2-ethyl caproic acid, t-butyl peroxy isobutyrate isobutyric acid, t-butyl peroxybenzoate benzoic acid, and mixtures thereof.

Polymerization of the first polymer with the at least one vinyl monomer may be accomplished in bulk, suspension, solution, or emulsion. Such methods are well known to those skilled in the art.

The presence of the at least one high vinyl segment in the first polymer (Block A) allows direction of the grafting site during the preparation of an engineered plastic. The direction of the grafting site is controlled by the location of the Block A in the first polymer, since the free radical polymerization proceeds through the vinyl groups of the first polymer.

Exemplary engineered plastics that may be prepared by the process of the disclosure include, but are not limited to, high impact polystyrene, styrene-maleic anhydride copolymer, methylmethacrylate-butadiene-styrene copolymer, transparent impact polystyrene, and acrylonitrile butadiene styrene copolymer.

The present invention will be described in more detail with reference to the following examples. While certain of the examples illustrate the use of polymers with at least one high vinyl segment to prepare HIPS, it is specifically contemplated that such polymers can be used to prepare other engineered plastics. The following examples are presented for purposes of illustration only and are not to be construed in a limiting sense.

EXAMPLES

Example 1

A 10-oz. crown-capped $N_2$ purged bottle was charged with 70 grams of a 1,3-butadiene (1,3-Bd)/hexane blend (21.7% 1,3-Bd)), 4.3 mmol of n-butyl lithium (nBuLi), and 2.7 mmol of vinyl modifier bis(2-oxolanyl) (OOPS) at 0° C. (ice-water bath). The bottle was allowed to warm up to 25° C. and left for 18 hours and then 2.7 mmol of triethylaluminum ($Et_3Al$) was added. The resulting high-vinyl polybutadienyl-lithium (60-

90% vinyl) (hVBR—Li) was used as the initiator for a polymerization in a 1 gallon stainless steel reactor.

The reactor was charged with 4.0 lb. of 21.7% 1,3-Bd in hexane blend, 2.0 lb. hexane and the hVBR—Li under $N_2$ pressure. After polymerization for 3 hours at 145-153° F., 210 g of 33% styrene/hexane blend was charged and polymerization proceeded for another 1 hour and 45 minutes. 4.5 mmol OOPS, 4.5 mmol 1,1-DPE (diphenylethylene) were added followed 90 minutes later by 8.6 mmol of benzophenone as the terminator. The resulting polymer had a number average molecular weight (Mn) of 142,600, a weight average molecular weight (Mw) of 204,630 (Mw/Mn=1.435), with 9.5% styrene (87% block styrene) and 32.6% vinyl content (Bd=100). Mw and Mn values are obtained from a calibrated GPC (Gel Permeation Chromatography) instrument.

In a subsequent HIPS experiment, the polybutadiene rubber was dissolved in styrene and polymerized at 100-165° C. The resulting HIPS showed exceptionally high gloss when molded.

Example 2

In a 10-oz. crown-capped $N_2$-purged bottle was charged 72 grams of a 1,3-Bd/hexane blend (21.7% 1,3-Bd), 6.0 mmol of nBuLi, and 3.0 mmol of the modifier OOPS at 0° C. (ice-water bath). The bottle was allowed to warm up slowly to 25° C. and left for 18 hours. Then 3.0 mmol of $Et_3Al$ was added. The resulting high-vinylpolybutadienyl-lithium (60-90% vinyl) (hVBR—Li) was used as the initiator for a polymerization in a 1 gallon stainless steel reactor.

The reactor was charged with 2.5 lb. of 21.7% 1,3-Bd in hexane blend, 2.0 lbs. of hexane, 1.6 lbs. of 33% styrene/hexane, and the hVBR—Li under $N_2$ pressure. After polymerization for 2 hours and 15 minutes at 145-155° F., 6.4 mmol OOPS and 12.0 mmol 1,1-DPE (diphenylethylene) were added followed 180 minutes later by 8.6 mmol of benzophenone as the terminator. The resulting polymer had a Mn 81,700 and Mw/Mn=1.253 with 58.1% styrene (36% block styrene) and 39.1% vinyl content (Bd=100), and was a 5/37/58 (hvPBd-b-lvPBd-t-PS) ABCF block copolymer.

Example 3

HIPS was made by dissolving Example 2 block copolymer in styrene—at three different levels—and polymerizing 5 hours at 135° C. The results are shown in Table 1. A high degree of grafting of the ABCF block copolymer rubber with polystyrene was found. Thin 1-2 mm sheets molded at 165° C. from these resins were clear and very flexible.

TABLE 1

|  | Sample No. | | |
|---|---|---|---|
|  | 1 | 2 | 3 |
| hvPBd-b-lvPBd-t-PS (g) | 2.0 | 2.5 | 3.0 |
| Styrene (g) | 8.27 | 7.62 | 6.95 |
| % Conversion Styrene | 83.9% | 83.7% | 77.3% |
| % ABC in HIPS | 22.4% | 28.2% | 35.8% |
| % Elastomer in HIPS | 15.7% | 19.7% | 25.1% |
| Mn of HIPS | 166,200 | 164,200 | 140,600 |
| Mw/Mn | 225,300 | 214,800 | 194,700 |
| % Grafting (Peakfit) | 80.3% | 76.4% | 70.3% |

The invention claimed is:

1. A method comprising the steps of:
   (a) adding a polymer containing at least one block A and at least one additional block selected from the group consisting of a block B, a block C, and combinations thereof to a solvent comprising at least one vinyl monomer;
   (b) optionally adding at least one additional inert solvent;
   (c) optionally adding additives selected from the group consisting of extender oils, modifiers, and antioxidants;
   (d) initiating polymerization of the at least one vinyl monomer by the use of an initiator and/or heat,
   wherein steps (a), (b) and (c) can be performed in any order;
   whereby the result of steps (a)-(d) is production of an engineered plastic;
   wherein the engineered plastic is selected from the group consisting of high impact polystyrene, styrene-maleic anhydride copolymer, methylmethacrylate-butadiene-styrene copolymer, transparent impact polystyrene, and acrylonitrile butadiene styrene copolymer;
   wherein said block A contains at least one high vinyl segment having a 1,2-vinyl bond content of greater than about 45% and a number average molecular weight of about 100 to about 20,000;
   wherein said block B has a vinyl content of less than about 45% and said block C comprises one or more aromatic vinyl monomers;
   wherein said polymer has an overall number average molecular weight of about 40,000 to about 300,000; and
   wherein the presence of the at least one high vinyl segment in the polymer allows direction of the grafting site during preparation of the engineered plastic.

2. A method as claimed in claim 1 wherein said polymer containing at least one high vinyl segment has a high vinyl segment in at least one end.

3. A method as claimed in claim 2 wherein said polymer is a block polymer with a structure selected from the group consisting of A-B, A-C, A-B-A, A-B—C, A-B—C—B-A, B—C-A, A-C, A-C-A, and A-C—B—C-A where A is a block of polybutadiene with a 1,2-vinyl bond content of about 45-100%, B is a polymer block with a 1,2-vinyl bond content of less than about 45%, and C is a polymer block comprising one or more vinyl aromatic monomers.

4. A method as claimed in claim 2 wherein A is a block of polybutadiene with a 1,2-vinyl bond content of about 60-100%.

5. A method as claimed in claim 2 wherein B is a polymer block with a 1,2-vinyl bond content of less than about 30%.

6. A method as claimed in claim 1 wherein said polymer containing at least one high vinyl segment has a high vinyl segment in the middle of the polymer chain.

7. A method as claimed in claim 6 wherein said polymer is a block polymer with a structure selected from the group consisting of B-A-B, C-A-C, and C—B-A-B—C, where A is a block of polybutadiene with a 1,2-vinyl bond content of about 45-100%, B is a polymer block with a 1,2-vinyl bond content of less than about 45%, and C is a polymer block comprising one or more vinyl aromatic monomers.

8. A method as claimed in claim 7 wherein A is a block of polybutadiene with a 1,2-vinyl bond content of about 60-100%.

9. A method as claimed in claim 7 wherein B is a polymer block with a 1,2-vinyl bond content of less than about 30%.

10. A method as claimed in claim 2 wherein said polymer containing at least one high vinyl end segment is prepared by a process comprising the following steps:
    a. forming a living prepolymer high vinyl initiator with a vinyl content greater than about 45% using a vinyl modifier,
    b. adding a $R_1R_2R_3$aluminum or $R_1R_2R_3$boron compound to nullify the effect of the vinyl modifier, and c. initiating polymerization of diene monomers using said living prepolymer high vinyl initiator so as to form a polymer product with a high vinyl end segment where $R_1$, $R_2$ and $R_3$ are selected from the group consisting of C1-C12 alkyl, C2-C12 alkene, C2-C12 alkyne, phenyl, and alkyl-substituted phenyl and may all be identical or may all be separately selected but cannot be H.

11. A method as claimed in claim 10 wherein the $R_1R_2R_3$ aluminum or $R_1R_2R_3$ boron compound are trialkyl compounds.

12. A method as claimed in claim 10 wherein step (a) comprises combining an anionic initiator, monomer and a vinyl modifier wherein said monomer includes one or more conjugated diene monomers.

13. A method as claimed in claim 10 wherein step (c) is conducted at a maximum temperature that is no more than 20° C. higher than the maximum temperature at which steps (a) and (b) are conducted.

14. A method as claimed in claim 12 wherein said anionic initiator is an organolithium compound.

15. A method as claimed in claim 12 wherein said conjugated diene is 1,3-butadiene.

16. A method as claimed in claim 10 wherein the vinyl modifier comprises at least one of hexamethyiphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyle ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, and N-methylmorpholine.

17. A method as claimed in claim 12 wherein said monomers further comprise at least one vinyl-substituted aromatic hydrocarbon.

18. A method as claimed in claim 10 wherein the polymer product with a high vinyl end segment from step (c) is coupled to produce a further product with at least two high vinyl end segments.

19. A method as claimed in claim 18 wherein a di-coupling, tri-coupling, tetra-coupling, quatra-coupling, penta-coupling or hexa-coupling coupling agent is used for the coupling.

20. A method as claimed in claim 6 wherein said polymer with a high vinyl segment in the middle is prepared by a process comprising:
   a. preparing an initial segment of the polymer wherein said initial segment comprises one or more blocks selected from the group consisting of B blocks, C blocks and mixtures thereof, where B is a polymer block with a 1,2-vinyl bond content of less than about 45%, and C is a polymer block comprising one or more vinyl aromatic monomers;
   b. preparing a further segment of the polymer by adding an A block to the initial segment of the polymer where A is a block of polybutadiene with a 1,2-vinyl bond content of about 45-100%;
   c. coupling the polymer resulting from step b to produce a polymer with a high vinyl segment in the middle of the polymer chain.

21. A method as claimed in claim 20 wherein said B block is selected from the group consisting of polybutadiene with a 1,2-vinyl bond content of less than about 45%, polyisoprene and mixtures thereof.

22. A method as claimed in claim 20 wherein said C block comprises one or more vinyl aromatic monomers.

23. A method as claimed in claim 20 wherein said C block is a polystyrene block.

24. A method comprising the steps of:
   a. forming a living prepolymer high vinyl initiator with a vinyl content greater than about 45% using a vinyl modifier,
   b. adding a $R_1R_2R_3$ aluminum or $R_1R_2R_3$ boron compound to nullify the effect of the vinyl modifier, and
   c. initiating polymerization of diene monomers using said living prepolymer high vinyl initiator so as to form a polymer product with a block A high vinyl end segment and a block B segment,
   d. adding the polymer containing at least one high vinyl end segment to a solvent comprising at least one vinyl aromatic monomer;
   e. optionally adding at least one additional inert solvent;
   f. optionally adding additives selected from the group consisting of extender oils, modifiers, and antioxidants,
   g. initiating polymerization of the vinyl aromatic monomer by the use of an initiator and/or heat, where $R_1$, $R_2$ and $R_3$ are selected from the group consisting of C1-C12 alkyl, C2-C12 alkene, C2-C12 alkyne, phenyl, and alkyl-substituted phenyl and may all be identical or may all be separately selected but cannot be H wherein steps (d), (e) and (f) can be performed in any order;

whereby the result of steps (a)-(g) is production of an engineered plastic;

wherein the engineered plastic is selected from the group consisting of high impact polystyrene, styrene-maleic anhydride copolymer, methylmethacrylate-butadiene-styrene copolymer, transparent impact polystyrene, and acrylonitrile butadiene styrene copolymer; and wherein the block A high vinyl end segment of the polymer has a 1,2-vinyl bond content of greater than about 45% and a number average molecular weight of about 100 to about 20.000;

wherein said block B has a vinyl content of less than about 45%;

wherein said polymer has an overall number average molecular weight of about 40,000 to about 300,000.

25. A method comprising the steps of:
(a) adding a polymer containing at least one block A and at least one additional block selected from the group consisting of a block B, a block C, and combinations thereof to a solvent comprising styrene;
(b) optionally adding at least one additional inert solvent;
(c) optionally adding additives selected from the group consisting of extender oils, modifiers, and antioxidants,
(d) initiating polymerization of the styrene by the use of an initiator and/or heat, wherein steps (a), (b) and (c) can be performed in any order;

whereby the product resulting from steps (a)-(d) is high impact polystyrene;

wherein said block A has a 1,2-vinyl bond content of greater than about 45% and a number average molecular weight of about 100 to about 20,000;

wherein said block B has a vinyl content of less than about 45% and said block C comprises one or more aromatic vinyl monomers;

wherein said polymer has an overall number average molecular weight of about 40,000 to about 300,000; and wherein the presence of the at least one high vinyl segment in the polymer allows direction of the grafting site during preparation of the high impact polystyrene.

* * * * *